United States Patent [19]

Wada

[11] Patent Number: 4,627,733
[45] Date of Patent: Dec. 9, 1986

[54] FLATNESS MEASURING APPARATUS
[75] Inventor: Toshiaki Wada, Takatsuki, Japan
[73] Assignee: Sumitomo Special Metals Co., Ltd., Osaka, Japan
[21] Appl. No.: 449,733
[22] Filed: Dec. 14, 1982

[30] Foreign Application Priority Data

Dec. 25, 1981 [JP] Japan .................................. 56-215418
Feb. 24, 1982 [JP] Japan ................................... 57-29620
Feb. 24, 1982 [JP] Japan ................................... 57-29621
Feb. 24, 1982 [JP] Japan ................................... 57-29622
Feb. 24, 1982 [JP] Japan ................................... 57-29623

[51] Int. Cl.$^4$ ............................................. G01B 9/02
[52] U.S. Cl. .................................... 356/359; 364/525
[58] Field of Search ................. 356/359, 360; 364/525

[56] References Cited

PUBLICATIONS

Moore et al., "Large Aperture AC Interferometer for Optical Testing", *Applied Optics*, vol. 17, No. 24, pp. 3959–3963, 12/78.
Forman, "The Zygo Interferometer System", *Proc. SPIE*, vol. 192, pp. 41–48, 1979.

*Primary Examiner*—Davis L. Willis
*Assistant Examiner*—Matthew W. Koren
*Attorney, Agent, or Firm*—Wenderoth, Lind & Ponack

[57] ABSTRACT

A flatness measuring apparatus which optically measures the flatness of an object, such as a slider surface of a magnetic head at a magnetic tape recording apparatus, required to have the flatness of hyperfine accuracy of 0.05 μm or less. The flatness measuring apparatus is so constructed that interference fringes related to the plane of the object and a reference plane are produced and caught by a one-dimensional image sensor and that an optical element disposed between the image sensor and an interference fringe producing means is turned to change the visual field in the extending direction of the interference fringe, and is provided with a unit for measuring the flatness in connection with the turning position information of the optical element and an output of the image sensor, so that the error factor, such as the ununiformness in the characteristic of each bit at the image sensor or disorder with the lapse of time in the optical system, can be eliminated to thereby gain the measurement accuracy of 0.01 μm, while, each component or assembly thereof having an accuracy on the order of 10 μm.

7 Claims, 12 Drawing Figures

FLATNESS MEASURING APPARATUS

BACKGROUND OF THE INVENTION (1) Field of the Invention

This invention relates to an optical system flatness measuring apparatus capable of measuring the flatness of an object with hyperaccuracy and automatically.

(2) Description of the Prior Art

There has been a tendency to require an extremely precise flatness of 0.05 μm or less for a sliding surface of a magnetic head at a magnetic tape recording apparatus. Various methods of utilizing the light interference have been used for non-contact measurement of the flatness, but there has never been found any example in practical use because many problems are created in the precision of components, hyperfine adjustment, and maintenance of the measurement accuracy, from the viewpoint of carrying out easy and stable measurement with the above accuracy.

The inventor has proposed an optical flatness measuring method (in Japanese Patent Laid-Open No. Sho 54-159258) aiming mainly at the automation of measurement. The principle of the above is utilized for the present invention, whereby explanation at first will be given on the principle of the former invention.

For example, a Fizeau optical interferometer, as shown in FIG. 1, is used to obtain interference fringes 1 caused by the plane of an object to be detected and the reference plane, such as an optical flat, the bright fringes being shown by solid lines and dark fringes by broken lines in the drawing. One-dimensional image sensor 34 matched lengthwise thereof with the directions of widths of interference fringes 1 is used to catch the pattern thereof at three positions a, b and c, so that the positions Pa, Pb and Pc widthwise of the fringes at the predetermined positions a, b and c of the bright (or dark) fringes and a pitch P of the fringe are detected by an output of image sensor 34, thereby computing a flatness F by the following equations:

$$F = \frac{\lambda}{2n} \times \frac{\Delta P}{P} \quad (1)$$

where

λ: interference light source wavelength, and n: interference order (herein n=1), and $$\Delta P = Pb - \frac{Pa + Pc}{2} \quad (2)$$

The inventor has used the above method to commence manufacture of the apparatus measurable of the flatness of an object with accuracy of 0.05 μm or less as abovementioned, in which the accuracy for processing various components and for assembly thereof and of optical parts, is required to be extremely high. Even when such accuracy is satisfied, a desired measurement accuracy, under the influence of external vibrations, cannot be achieved, whereby the apparatus has been extremely difficult for practical use. In order to thoroughly solve the above problems, the present invention has been designed.

OBJECTS OF THE INVENTION

A first object of the invention is to provide a flatness measuring apparatus which is capable of automatically measuring the flatness in non-contact and with high accuracy of 0.01 μm.

A second object of the invention is to provide a flatness measuring apparatus of high measurement accuracy, whose accuracy for components and assembly thereof is enough to be of 10 μm order and about equal to that of a usual precision instrument, whereby there is no need of hyperfine adjustment during use and of troublesome maintenance.

A third object of the invention is to provide a flatness measuring apparatus of high accuracy, which eliminates the main factor for an error in measurement caused by vibrations.

A fourth object of the invention is to provide a flatness measuring apparatus capable of setting a region for the measuring object by simple operation.

A fifth object of the invention is to provide a flatness measuring apparatus which can make visible the interference fringes caught by the image sensor and be confirmed of the execution of hyperfine measurement to thereby raise the reliability of the apparatus.

A sixth object of the invention is to provide a flatness measuring apparatus of high accuracy, which is free from any identification mistake of interference fringes during the process of data obtained by the image sensor.

A seventh object of the invention is to provide a flatness measuring apparatus which is capable of performing the measurement with high accuracy by compensating variations in the photoelectric conversion characteristic even when existing in a number of photoelectric conversion elements constituting the image sensor respectively, and an eighth object of the invention is to provide a flatness measuring apparatus which is adapted to prevent the measurement accuracy from lowering by an error from the external vibration and a disorder in the optical system after the lapse of time.

The above and other related objects and flatness of the invention will be apparent from a reading of the following description of the disclosure in the accompanying drawings.

DESCRIPTION OF THE PREFERRED EMBODIMENT

Figure 2:
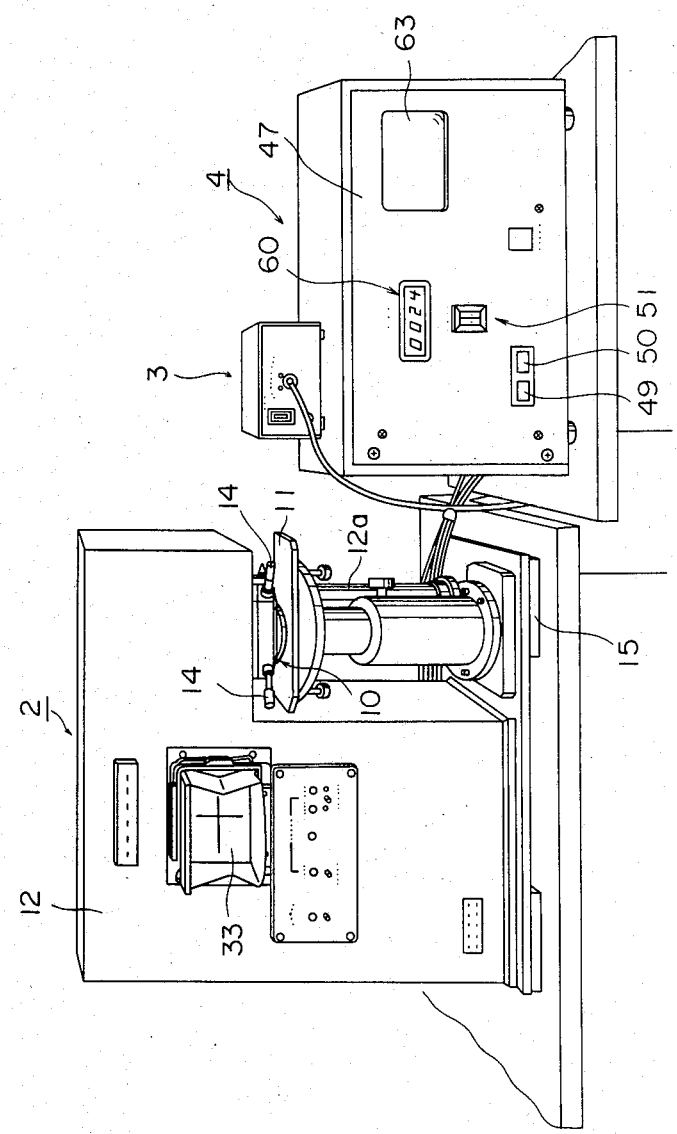
FIG. 2 is an exterior view of an embodiment of a flatness measuring apparatus of the invention.
Figure 3:
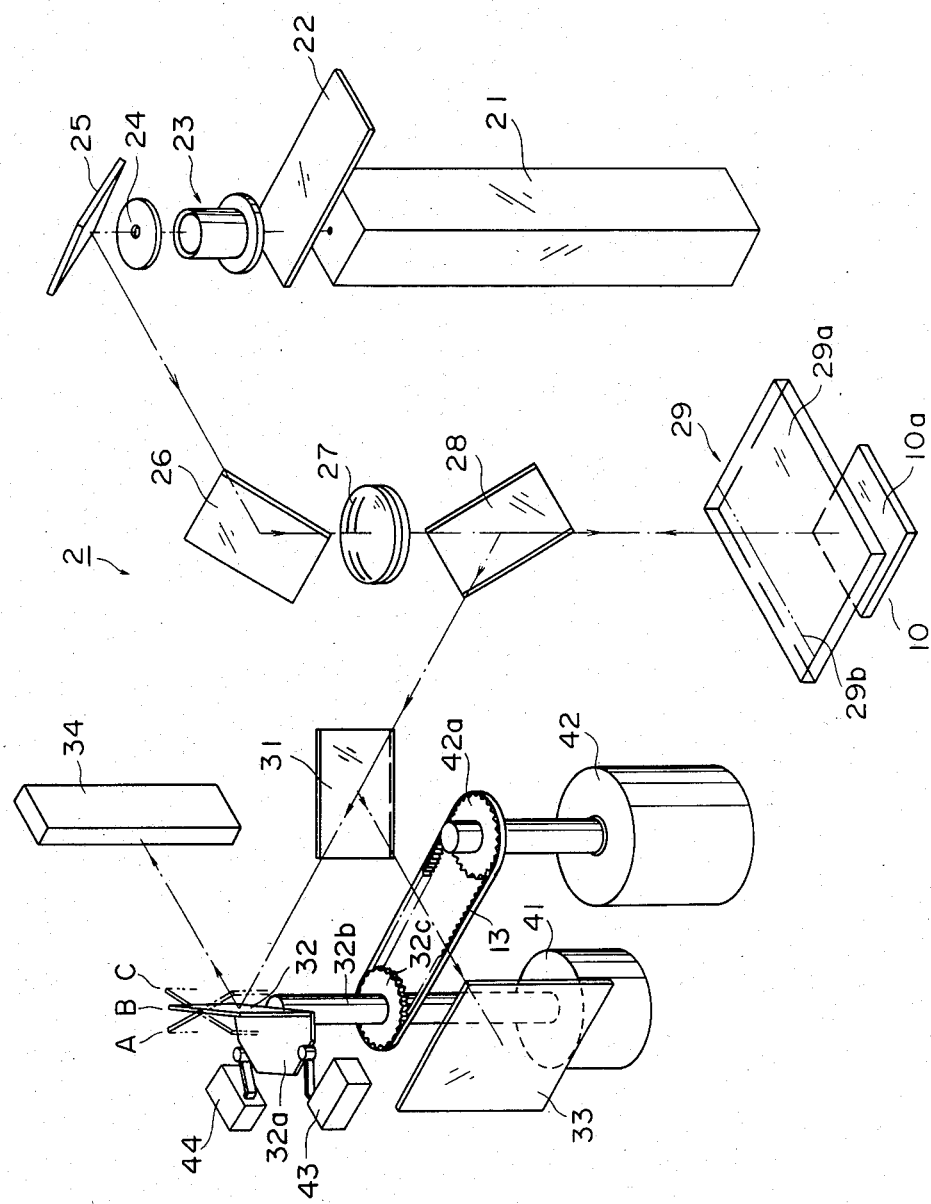
FIG. 3 shows a layout of an optical system.

FIG. 2 is an exterior view of a flatness measuring apparatus of the invention and FIG. 3 shows a layout of the optical system of the apparatus, the optical system, except for a vertical movable sample stage 11 on which an object 10 to be detected is placed facing upwardly, is encased in a casing 12 internally shaded. A helium-neon laser 21 (having a wavelength of 0.6328 μm) and used as the interference light source is mounted vertically and directed upwardly at the output side within a cylinder 12a of casing 12 provided behind the sample stage 11, so that the laser beam reaches a total reflection mirror 25 provided above, through a ND filter 22, a beam diverging lens 23 and a pinhole 24 having a 20 μm diameter. The total reflection mirror 25 is tilted at an angle of 45° from the horizontal line and faces downwardly so as to reflect a minute diameter laser beam from the pinhole 24 horizontally and forwardly of casing 12. A total reflection mirror 26 is disposed above the sample stage 11 on the optical path of the laser beam and is tilted at an angle of 45° from the horizontal line and faces downwardly, thereby projecting the beam vertically to the sample stage 11, the laser beam being adapted to travel toward the sample stage 11 through an achromat 27, a half mirror (semi-transparent mirror) 28 and an optical flat 29, as the objective, provided between the total reflection mirror 26 and the sample stage 11, the half mirror 28 being tilted at an angle of 45° from the horizontal line so as to reflect horizontally and leftwardly of casing 12 the light travelling from the optical flat 29, i.e., the interference fringe pattern caused by the reference flat surface 29a and the plane of object 10a to be detected.

The light beam reflected from the half mirror 28 goes in part through a half mirror slanted at an angle of 45° both laterally and longitudinally of casing 12 and reaches a total reflection mirror 32 mounted horizontally rotatably around a vertical shaft, and is reflected in part by a half mirror 31 to reach a focusing hood 33 provided at the front of casing 12, the focusing hood 33 used for visual observation of the interference fringes and for photographing. Behind the vertical shaft of total reflection mirror 32, a one-dimensional image sensor 34 comprising a number of photoelectric conversion elements disposed in alignment is provided lengthwise vertically. When the total reflection mirror 32 rotates to the position where it is slanted at an angle of 45° laterally and longitudinally of casing 12, the visual field of image sensor 34 is positioned at b in FIG. 1, i.e., at an approximately central position of interference fringe obtained by the optical system, and when the mirror 32 rotates clockwise (or counterclockwise), the visual field of image sensor 34 shifts to the position c (or position a).

The total reflection mirror 32 is mounted to a suitable frame 32a and rotates through a rotary shaft 32b of a round rod extending downwardly from the lower center of frame 32a, the rotary shaft 32b carrying at an intermediate portion a gear 32c and connecting at the lower end with a rotary encoder 41 supported to a pedestal (not shown). At the lateral side of rotary encoder 41, a pulse motor 42 having a vertical output shaft is mounted on the pedestal, and a cogged belt 13 is put between the gear 32c and a gear 42a mounted to the output shaft of pulse motor 42 so that the pulse motor 42 is driven to rotate the total reflection mirror 32 horizontally by the cogged belt 13. Limit switches 43 and 44 are provided in a area of rotation of frame member 32a, thereby controlling the limit of rotation area, the limit of rotation area as abovementioned being defined in the position where the visual field of image sensor 34 rotates at an about equal angle (10° or less) counterclockwise or clockwise from the position b.

As seen from the above, the interference optical path, and more particularly the luminous flux superimposed optical system which guides the light at the detection side toward the image sensor 34 by use of the rotatable total reflection mirror 32 (which may also be a prism), is constructed to change the position where the interference fringes are to be read by the rotation of mirror 32. Alternatively, other than the Fizeau interferometer as abovementioned, other optical apparatuses, e.g. a Michelson interferometer may be used to obtain interference fringes. In addition, reference numeral 14 designates screws for attitude control of optical flat 29, and 3 designates a laser power source provided outside the casing 12.

A main body 2 of the flatness measuring apparatus comprising the casing 12 and optical system therein, forms components as firm as possible in order to eliminate measurement error caused by vibration, and provides at the bottom buffer rubber legs 15 in consideration of the prevention of vibration. In addition, the accuracy for mounting position of the optical system and that for machining the movable components are of 10 μm orders respectively. Also, the half mirror 31 and optical flat 29 have their rear surfaces tapered at several degrees to avoid back interference.

Figure 4:
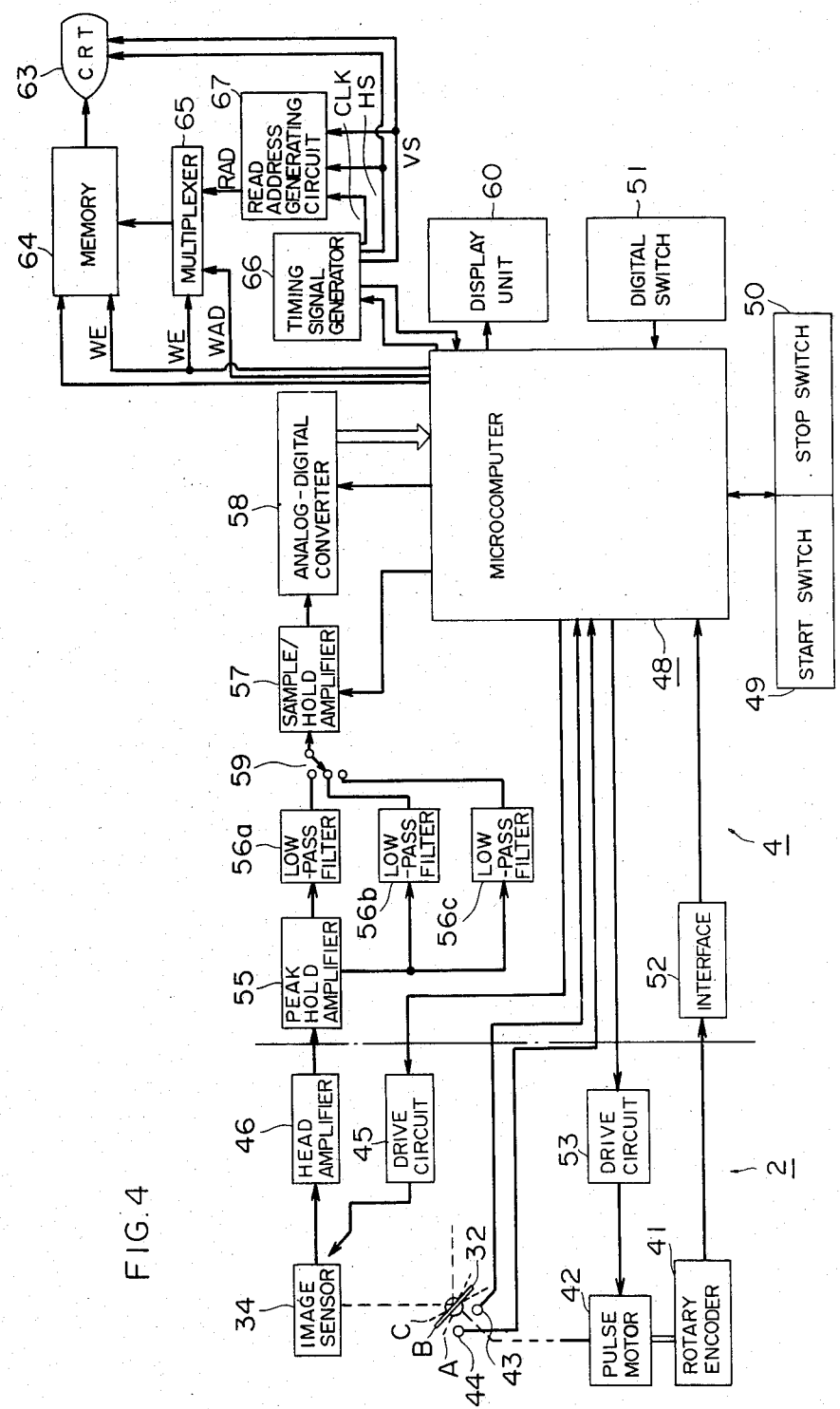
FIG. 4 is a block diagram of an electronic circuit.

FIG. 4 is a schematic block diagram of the principal portion of an electronic circuit of the flatness measuring apparatus of the invention, in which a control unit 4 exclusive of the aforesaid image sensor 34, rotary encoder 41, pulse motor 42, a drive circuit 53 therefor, limit switches 43 and 44, a drive circuit 45 for the image sensor 34, a head amplifier 46, some other operating members, and pilot lamps, is mounted inside and outside a casing 47.

Reference numeral 48 designates a microcomputer used for control and computation in the apparatus of the invention, which comprises a CPU (central processing unit), a ROM (read only memory), a RAM (random access memory), an input-output interface, and a clock pulse oscillation circuit.

A start switch 49 and a stop switch 50 in front of control unit 4 are push button type illuminated switches for giving to the microcomputer 48 the command of a start, stop or intermission of measurement, and are pushed to give the above command to the microcomputer 48 and are lit by a signal therefrom. A digital switch 51 in front of the control unit 4 comprises two thumb wheel switch units, whose contents are input to the microcomputer 48 as the data used to assign the visual field by which the image sensor output for an object of the flatness computation of the object 10 to be measured is to be obtained; in other words, the data is used for indicating the rotary-angular position of the total reflection mirror 32 when the position a or c is adopted as the visual field. The rotary encoder 41 is so constructed that ten pulses are output per rotation at an angle of 1° of total reflection mirror 32, the output being read into the microcomputer 48 through the interface 52 from the encoder 41, the microcomputer 48 reading thereinto the operation conditions of the limit switch 43 regulating the counterclockwise rotary area of total reflection mirror 32, and of that 44 regulating the clockwise rotary area the same.

The operating conditions of limit switches 43 and 44 are used as control information to start or stop the pulse motor and are input to the microcomputer 48. In detail, in the initial state, the total reflection mirror 32 is in a condition of actuating the limit switch 43. When the start switch 49 is pushed in the above condition, the microcomputer 48 inputs a signal to the motor drive circuit 53 to normally rotate the pulse motor 42 and turn the total reflection mirror 32 clockwise, whereby the total reflection mirror 32 turns to actuate the limit switch 44. Or, when the stop switch 50 is pushed, the microcomputer 48 cuts off the signal for normal rotation of pulse motor 42 and inputs a signal to the motor drive circuit 53 to reversely rotate the pulse motor 42 and turn the total reflection mirror 32 counterclockwise, whereby the total reflection mirror 32 turns to actuate the limit switch 43 and the signal for the motor drive circuit 53 is cut off.

The microcomputer 48 is provided with a counter for specifying the visual field position of image sensor 34 and the turning position of total reflection mirror 32, the counter being adapted to be cleared by a 0 point pulse generated by the rotary encoder 41. The rotary shaft 32b and rotary encoder 41 are coupled with each other so that the 0 point pulse can be obtained at the position where the total reflection mirror 32 turns slightly clockwise from the position where the limit switch 43 is actuated. Assuming that the position B where the total reflection mirror 32 turns when the count value of the counter becomes 90, corresponds to the visual field position b where the output of the image sensor 34 at that time is to be used for the flatness computation and the number on the digital switch 51 is represented by X, the microcomputer 48 takes two positions A and C of total reflection mirror 32 when the counter counts values of 90−X and 90+X, for the visual field positions a and c where the output of image sensor 34 at that time is to be used for the flatness computation. However, X is to be the value representing the dimension between the positions a and c in mm unit and is computed as $X=(X/2)-0.2$ because the optical system is constituted to allow a pulse of rotary encoder 41 to correspond to 0.2 mm in the visual field.

The image sensor 34 is preferred to be of about 100 bits per interference fringe caught by the above. However, since a length λ/2 between mutually adjacent bright fringes (or dark fringes) is measured with an accuracy of 1/100, the accuracy in this case can theoretically be obtained as follows:

$(\lambda/2) \times (1/100) \approx 0.003$ μm, thereby easily materializing the accuracy of 0.01 μm in practical use. Accordingly, the embodiment of the invention has employed a metal-oxide-semiconductor sensor of 1024 bits with respect to the optical system for catching ten interference fringes, the pitch of the photodiode in the image sensor being 20 μm.

Now, the microcomputer 48, when starting the data read process, generates a start pulse and clock pulse to the drive circuit 45, which inputs pulses at a predetermined level to the image sensor 34. Then, the image sensor 34 is scanned sequentially from the first bit to the 1024th bit and generates a video output corresponding to the intensity of the light received by the sensor 34, the video output being amplified by the head amplifier 46 and input to the microcomputer 48 as digital data through the peak-hold amplifier 55, low-pass filter 56a, a 56b or 56c, sample/hold amplifier 57, and an analog-digital converter 58. The cycle periods of the sample/hold and analog-digital conversion have been matched with the cycle period of clock pulse input to the drive circuit 45.

The low-pass filters 56a, 56b and 56c respectively have 500 Hz cutoff frequencies, 250 Hz and 100 Hz, one of which being selected by a change-over switch 59. The choice of filter may depend upon the noise frequency caused by vibrations or the like from the exterior.

On a basis of the data stored as abovementioned, the flatness is computed by the equation (1) and the result of computation is displayed by a four digit display unit 60 provided at the front of control unit 4, and at μm unit and down to three places of decimals. Furthermore, a cathode ray tube (CRT) 63 provided at the front of casing 47 is adapted to display the two-dimensional information of interference fringes at the overall visual field obtained by the visual field scanning of image sensor 34 performed by turning the total reflection mirror 32. The display by the cathode ray tube (CRT) 63 is carried out by use of the following circuitry.

Reference numeral 64 designates a video memory corresponding to the picture element of CRT 63, in which memory is written the pattern information to be displayed under control of microcomputer 48, the pattern information being read out and displayed by CRT 63. The pattern to be displayed is the longitudinal line representing the bright fringe and visual field positions a, b and c, which are displayed in white respectively. The microcomputer 48 inputs data, to the video memory 64 via a multiplexer 65, said data specifying the white picture elements at CRT 63 and being the write address information WAD. The writing data itself inputs one bit of data representing white and black directly to the memory 64; the multiplexer 65, when given a write enable signal WE is input thereto from the microcomputer 48, selects the write address WAD and inputs it into the video memory 64; the write enable signal WE is also input to the video memory 64 so that the video memory 64 is kept in the write enable condition while the signal WE is being input to the video memory 64.

A timing signal generator 66, which comprises an oscillator and a frequency divider, is started by a signal from the microcomputer 48, and generates a vertical synchronizing signal VS and a horizontal synchronizing signal HS, the synchronizing signals VS and HS being input to CRT 63 and a read address generating circuit 67. The timing signal generator 66 generates a number of clock pulses CLK which are equal to the number of horizontal picture elements of CRT 63 in one cycle period of horizontal synchronizing signal HS, the clock pulses CLK being input to the read address generating circuit 67. The read address generating circuit 67 forms read address RAD for the video memory 64 to perform the data read-out corresponding to the beam scanning at CRT 63, which is so constructed that the main scanning direction (horizontal) address is reset by horizontal synchronizing signal HS and is incremented by clock signal CLK, and the sub-scanning direction (vertical) address is reset by vertical synchronizing signal VS and is incremented by horizontal synchronizing signal HS. Furthermore, the timing signal generator 66 input a predetermined signal to the microcomputer 48 during the vertical flyback time in the beam scanning for CRT 63, so that the microcomputer 48 receives this signal and generates the aforesaid write enable signal WE to perform data writing during the above time regardless of the display on the CRT 63. Alternatively, an interface may be provided for connecting to a plotter or printer to thereby obtain a hard copy of the picture displayed by CRT 63. In this case, the stored data in the video memory 64 is usable as is. The plotter or printer may be mounted on the control unit 4.

Figure 5:
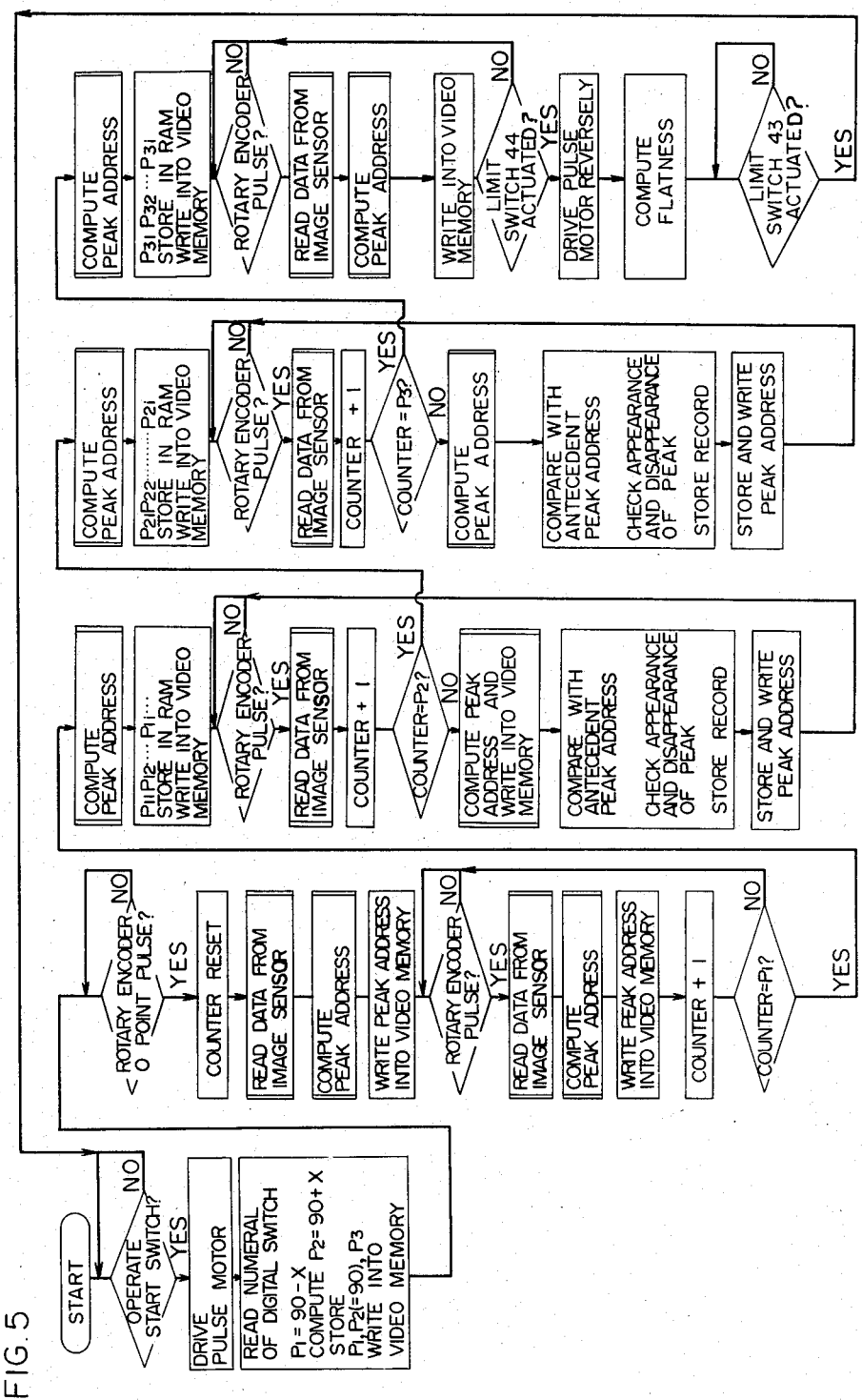
FIG. 5 is a flow chart of a main program showing the control content of a microcomputer.

Next, FIG. 5 shows a flow chart representing the control contents of microcomputer 48 and explanation will be given on the control. The start switch 49 is operated to normally rotate the pulse motor 42.

The content X of digital switch 51 is read to gain $P_1=90-x$ and $P_3=90+x$, and $P_2(=90)$ regulating the $P_1$, $P_3$ and position B, is kept in the predetermined register, at which time the visual field positions a, b and c corresponding to $P_1$, $P_2$ and $P_3$ are written in the video memory 64 for display on the white longitudinal line, in which the horizontal addresses at the write address each are the same. Upon a start of pulse motor 42, the 0 point pulse slightly later is input from the rotary encoder 41, the origin pulse input resetting the counter, which counts the output pulses of rotary encoder 41, in order to specify the visual field position of image sensor 34. Then, the data from image sensor 34 is read (to be mentioned below) and the peak address is computed (to be mentioned below), the peak address corresponding to bit addresses 1 to 1024 of image sensor 34 holding the bright fringes and to the information used for computation of the aforesaid P and ΔP. The computed peak address (equal in number to the bright fringes) is written into the video memory 64 for the display. Thus, the horizontal address of write address WAD is so determined that the CRT 63, so as to display the detection result in the visual field when the content of the counter is zero, may be positioned near the left end of the raster, thereby deciding the vertical address having said horizontal address in common and related to the peak address.

When the pulse is input from the rotary encoder 41, the data from the image sensor 34 is again read and the peak address is computed and written in the video memory and then the counter is incremented, which is repeated until the content of the counter coincides with $P_1$ at the register. In addition, in the time period irrespective of the writing, the data sequentially written is read out from the video memory 64 and displayed continuously in CRT 63.

In a case that the counter content becomes $P_1$, the peak addresses $P_{11}$, $P_{12}$, ... $P_{1i}$ ... are computed and kept in the random access memory (RAM) in the microcomputer 48 and written in the picture memory 64. In this case, the writing in the RAM is kept separately in two areas, one of which is used for computation of P and ΔP and the other for corresponding to the peak address, i.e., for identification of bright fringes. The writing of data from the image sensor 34 and the incrementing of the counter are performed each time a pulse is output from the rotary encoder 41, whereby the data written from the image sensor 34 is used to compute the peak addresses and write them into the video memory 64. The computed peak addresses are compared with the peak addresses, at first $P_{11}$, $P_{12}$ ... $P_{1i}$ ..., obtained by the peak address computation one in advance, so that the record with respect to the peak addresses corresponding to bright fringes newly appearing or those disappearing, is kept together with the address in the RAM. The peak addresses kept in the RAM are used as the data in comparison with the next computed peak addresses, such process, being continued until the counter content becomes $P_2$. The aforesaid sequential comparison of the peak address performs the identification of bright fringes, resulting in that, even when the interference fringe pattern is complex, the mutually adjacent bright fringes which are different in wavelength of by λ/2 are never misconceived or confused.

When the counter content becomes $P_2$, in a fashion similar to the above, the peak addresses $P_{21}$, $P_{22}$ ... $P_{2i}$ ... are computed and written in the video memory 64 for display and kept in the RAM for the flatness computation or the bright fringe identification.

Between $P_2$ and $P_3$, hereinafter, the peak addresses are written into the picture memory 64 and stored in the RAM for the identification of bright fringes. Also, when the counter becomes $P_3$, they, similarly to the cases of $P_1$ and $P_2$, are written into the video memory 64 and stored in RAM.

Thereafter, the data read, peak address computation, and writing of peak addresses into the video memory 64, are carried out repeatedly until the limit switch 44 is actuated, so that the limit switch 44 is actuated to reversely rotate the pulse motor 42, whereby the peak addresses among those at $P_1$, $P_2$ and $P_3$, regarding the common bright fringes, are computed of the flatness and the results thereby are displayed on the numerical value display unit 60.

Hence, among the visual fields of image sensor 34 changed by turning the total reflection mirror 32, the visual field area from the position where the 0 point pulse of rotary encoder 41 is obtained to the visual field area directed toward the visual field positions a, b and c, lead to writing the peak addresses or bright fringe data into the video memory 64. Thereafter, CRT 63 displays an enlarged fringe pattern which is the same as that appearing in the focusing hood 33 and the longitudinal lines showing the visual field positions a, b and c respectively.

Figure 6:
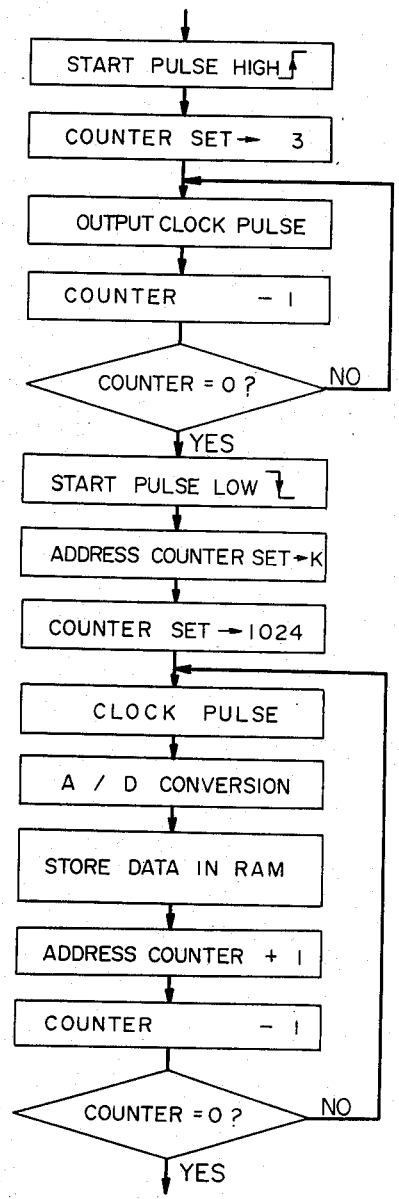
FIG. 6 is a flow chart of a read process of data from the image sensor.

Next, an explanation will be given on the read process of data from the image sensor 34 based on the flow chart shown in FIG. 6. When the predetermined conditions, such as the input of pulse of rotary encoder 41, for starting the data read-in, an output port, which is connected to the drive circuit 45 so as to give thereto a starting pulse, is put at a high level, the predetermined counter is the microcomputer 48 is set to a count of 3, and then a clock pulse is input to the drive circuit 45. The clock pulse allows the counter to decrease in count value so that the output port is put at a low level after the counter content becomes zero, that is, the start pulse breaks. The above process is for the purpose of compensating for a time delay (for three pulses) from the receiving of the start pulse by the image sensor 34 until the first bit output is generated.

Next, the head address K in the inner area of the RAM arranged for the data-reading is set in an address counter and the bit number of 1024 of image sensor 34 is set at the predetermined counter. Then, the output of image sensor 34 is analog-digital-converted in synchronism with the clock pulse, the converted data is stored in the address K, and the address counter is incremented and the above count is decreased. Such a process is continued until the counter content becomes zero and then the data is stored in the addresses K to K+1023 in the RAM.

Figure 7:
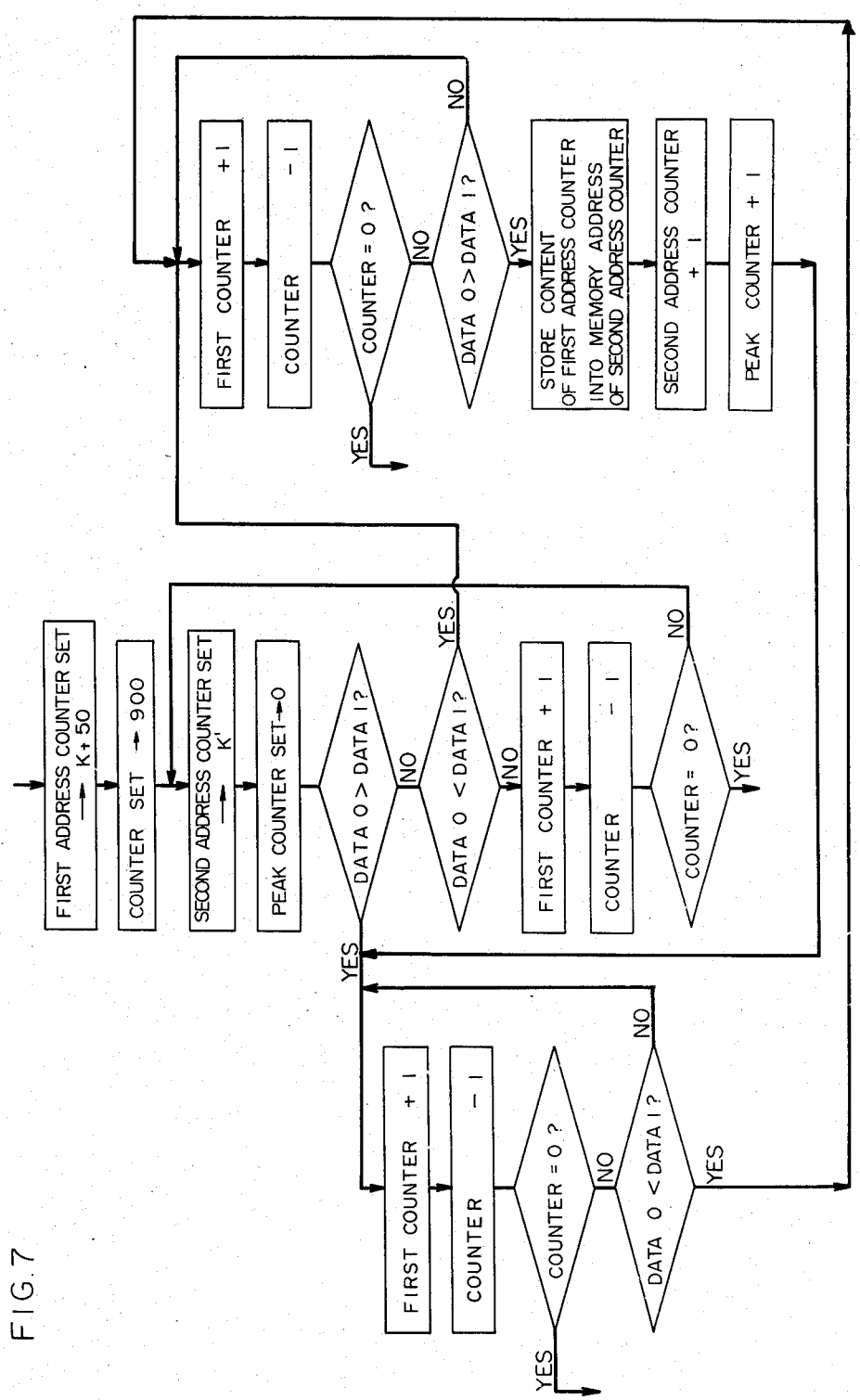
FIG. 7 is a flow chart of a peak address computation process.

FIG. 7 is a flow chart showing the process content for peak address computation. Firstly, K (the head address in the RAM area wherein data of 1024 for the processing object is stored) +50 is set in a first address counter, and numeral 900 in another counter, which is the process to take off the uppermost 51 bits and the lower end 124 bits from among the abovenoted 1024 bits from the data processing object. Next, the head address in the RAM wherein the computed peak addresses are to be stored, is set to K, stored in to a second address counter. Numeral 0 in a peak counter used is set to a peak counter for counting the number of computed peak addresses.

Next, DATA 0 of the address (at first, address K+50) in the first address counter and DATA 1 at the next address (at first, address K+51) are read and compared with each other. When the data are equal (which means the light-receiving levels of both bits are equal), the content of the first address counter is increased +1 and the counter decreased by −1. Then the subsequent addresses are applied to the same process.

On the other hand, when DATA 0 > DATA 1 (which means that the (K+51)th bit is darker than (K+50)th bit), the first address counter increases by +1 and the counter decreases by −1. In this condition, DATA 1 (data of address K+20) and DATA 0 (data of address K+51) are read out and compared with each other, so that, when DATA 1 > DATA 0 is not true, there is the tendency that the picture becomes dark as the address becomes larger, thereby repeating the same process. In this process, when DATA 0 < DATA 1 occurs, the specific peak address step in the following description will start.

In other words, in a case where the first address counter is K+50, or DATA 0 < DATA 1 occurs in the process of sequential increment, the picture tends to become bright as the address is enlarged to proceed with the data processing. In this case, the process of increasing the first address counter by +1 and decreasing the counter by −1, is repeated until DATA 0 > DATA 1 is obtained (in other words, until the address of the brightest bit becomes the content of the first address counter). In this step, the content of the first address counter, as the peak address, is stored in the RAM address (at first, address K') indicated by the second address counter, so that the second address counter has the content of +1 and the peak counter increases by +1, and then the comparison of DATA 0 with DATA 1 is repeated. The above process is carried out until the content of the counter becomes 0.

The peak addresses obtained by the above process use the positional information based on the center of bright fringe of the interference fringes caught by the image sensor. This information is used in computation of the flatness as explained below, while displayed on the CRT 63 as mentioned above. In addition, in the former description, the peak addresses, for the convenience of explanation, are written into the video memory 64 for the purpose of display, but the bright fringes become so thin as to not be visible, whereby also regarding the peak address and the addresses at both sides thereof, the data to be displayed as white areas are adapted to be written in the video memory 64.

Figure 1:
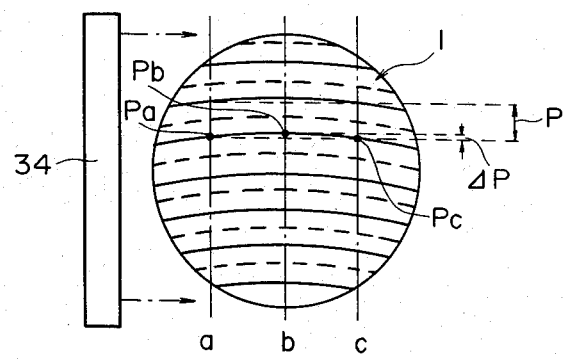
FIG. 1 is a view explanatory of the measurement principle.

Now, the flatness measuring apparatus of the invention uses the aforesaid peak addresses $P_{11}, P_{12} \ldots P_{1i} \ldots, P_{21}, P_{22} \ldots P_{2i} \ldots$, and $P_{31}, P_{32} \ldots P_{3i} \ldots$, for data for the flatness computation, but the bright fringe (e.g. the bright fringe shown by the lowermost continuous line in FIG. 1), which appears or disappears on the way between the addresses $P_1(=90-x)$ and $P_3(=90+x)$, is omitted from the processing object, which fringe, after computation of the peak address computation as above-mentioned, is identified by comparison with the peak address computed in advance of one output pulse of the rotary encoder 41, and its record's information is input to the RAM.

Figure 8:
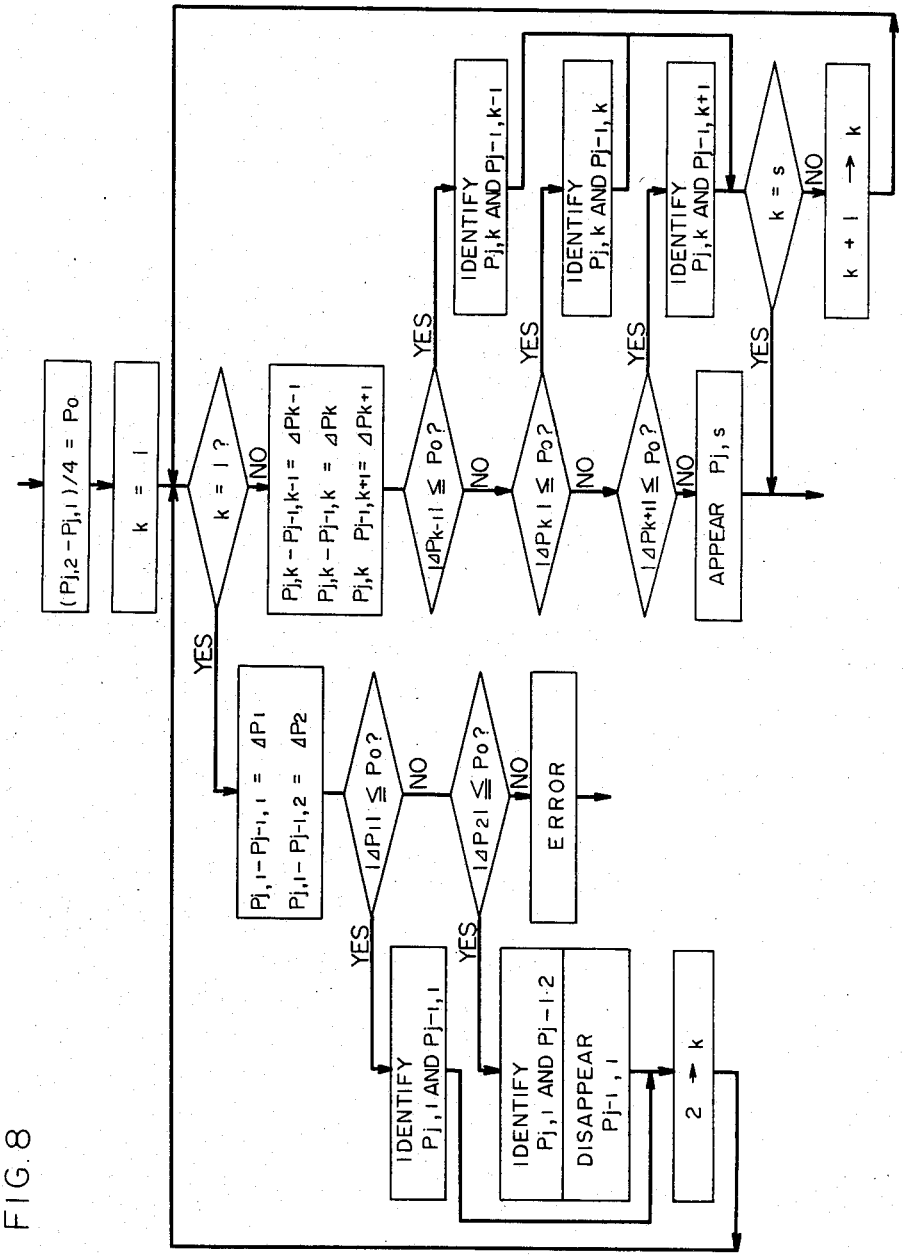
FIG. 8 is a flow chart of an address identification process.

The identification of bright fringes by the peak addresses is carried out as follows:

The latest peak addresses, as shown in the flow chart of the FIG. 8, are represented by $P_{j,1}, P_{j,2} \ldots P_{j,s}$ (S: count value of peak counter) and the peak address in advance of one output of the rotary encoder 41, by $P_{j-1,1}, P_{j-2,2} \ldots$ At first $(P_{j,2}-P_{j,1})/4=P_0$, $\pm \frac{1}{4}$ of fringe pitch P is computed so that the condition of fringe identification is decided to be less than the result of the computation.

Differences $\Delta P_1$ and $\Delta P_2$ between $P_{j,1}$ and $P_{j-1,1}$ and between $P_{j,1}$ and $P_{j-1,2}$, are computed to identify as the same fringes smaller than $P_0$ in combination. In case of identifying $P_{j,1}$ with $P_{j-1,2}$, $P_{j-1,1}$ is stored as is or left as unnecessary to the flatness computation. Then, the differences $\Delta P_{k-1}$, $\Delta P_k$, and $\Delta P_{k+1}$ between the k(2, 3 ... s)th peak $P_{j,k}$ and $P_{j-1,k-1}$, $P_{j,k}$ and $P_{j-1,k}$; and $P_{j,k}$ and $P_{j+1,k}$; are obtained respectively so that the combined fringes, when the differences are not more than $P_0$, are identified as the same.

In other words, in the case where the difference $\Delta P_{k-1}$ between $P_{j,k}$ and $P_{j-1,k-1}$ is smaller than $P_0$, $P_{j,k}$ and $P_{j-1,k-1}$ are identified as the same bright fringe peak address; in the case where $\Delta P_k$ between $P_{j,k}$ and $P_{j-1,k}$ is smaller than $P_0$, $P_{j,k}$ and $P_{j-1,k}$ are identified as the same bright fringe peak address; and in the case where $\Delta P_{k+1}$ between $P_{j,k}$ and $P_{j-1,k+1}$ is smaller than $P_0$, $P_{j,k}$ and $P_{j-1,k+1}$ are identified as the same bright fringe peak addresses.

In case that any of $\Delta P_{k-1}$, $\Delta P_k$ and $\Delta P_{k+1}$ is larger than $P_0$, the identification is carried out for the new appearance of bright fringe $P_{j,s}$.

Thus, among the peak addresses $P_{11}, P_{12} \ldots P_{1i} \ldots, P_{21}, P_{22} \ldots P_{2i} \ldots$; and $P_{31}, P_{32} \ldots P_{3i} \ldots$, except for those of record's which appear or disappear on the way, the numeral values of each one set of three combined in the decreasing order are identified as the peak addresses in connection with the same bright fringes. Hence, the data of one set of three peak addresses is computed to give the flatness by the following equation (1):

$$F_1 = \frac{\lambda}{2n} \times \frac{P_{21} - (P_{11} + P_{31})/2}{P_{22} - P_{21}}$$

$$F_2 = \frac{\lambda}{2n} \times \frac{P_{22} - (P_{12} + P_{32})/2}{P_{23} - P_{22}}$$

$$F_{m-1} = \frac{\lambda}{2n} \times \frac{P_{2m-1} - (P_{1m-1} - P_{3m-1})/2}{P_{2m} - P_{2m-1}}$$

Thus,

Flatness $F = (F_1 + F_2 + \ldots + F_{m-1})/(m-1)$ (1), where m is the number of fringes in common to the visual field positions a, b and c.

The flatness F as mentioned above is displayed in the display unit 60. Incidentally, in the case where a value of m is not more than 2 or not less than 16, the error display is carried out because the former value of m may lead to a shortage of data and the latter may lack reliability. Alternatively, the maximum and minimum values among $F_1$ through $F_{m-1}$ may not be used for computation of the flatness F to thereby enable the omission of improper data. In addition, the above process of course is applicable to the dark fringes in the same way as to the bright ones.

Figure 9:
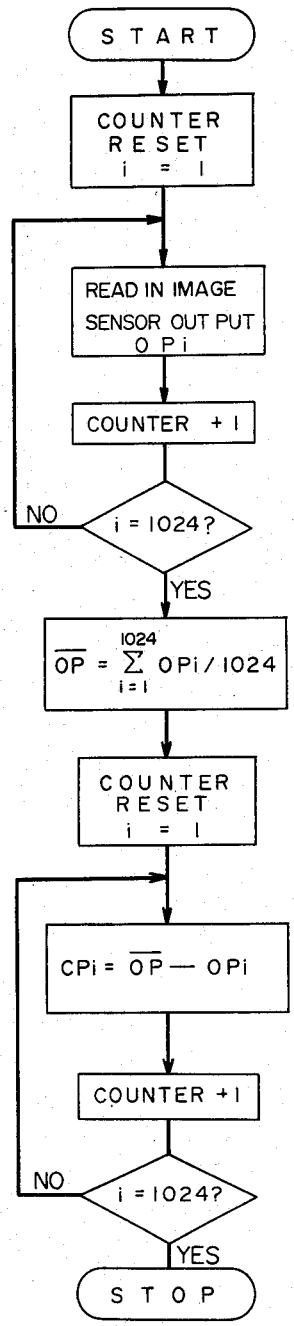
FIG. 9 is a flow chart of a compensatory mode.

Now, in a case of using a diode array comprising a number of photoelectric conversion elements juxtaposed as the one-dimensional image sensor 34, variations, usually of about 10 to 15%, in the conversion characteristics of the respective elements may increase a measurement error to make impossible the aforesaid hyperfine adjustment. In this case, in order to eliminate the variation in the characteristics to ensure the measurement with high accuracy, the following process need only be carried out by the microcomputer 48:

FIG. 9 is a flow chart of the control content of microcomputer 48 when operating in the compensation mode, which need only be operated at any time and at need. For the operation, the object 10 to be measured is kept not set and a compensation mode command switch (not shown in the Fig.) is operated to give an execution command to the microcomputer 48.

Upon detecting the operation of the compensation command switch, the microcomputer 48 reads all the photoelectric conversion elements at the image sensor 34, that is, an output $OP_i$ of the first bit (the counter content $i=1$) to the 1024th bit (the counter content $i=1024$) and stores it in the predetermined area of the RAM. In this case, the image sensor 34, differently from the previously described flatness measurement, is receiving at all the photoelectric conversion elements the uniform catoptric light from the reference plane 29a.

Next, the mean value $\overline{OP}$ of all the photoelectric conversion elements is given by the following equation, after computing the output $OP_i$ ($i=1$ to $1024$) from the RAM:

$$\overline{OP} = \sum_{i=1}^{1024} OP_i/1024. \quad (3)$$

A difference $CP_i$ between the mean value $\overline{OP}$ and the output $OP_i$ is computed as $$CP_i = \overline{OP} - OP_i \quad (4)$$

The difference $CP_i$ is used as data to compensate for the differences or variations in the photoelectric conversion characteristics of the respective photoelectric conversion elements and together with the information i used to specify the elements, is stored in the RAM, thereby completing a series of operations in the compensation mode.

Figure 10:
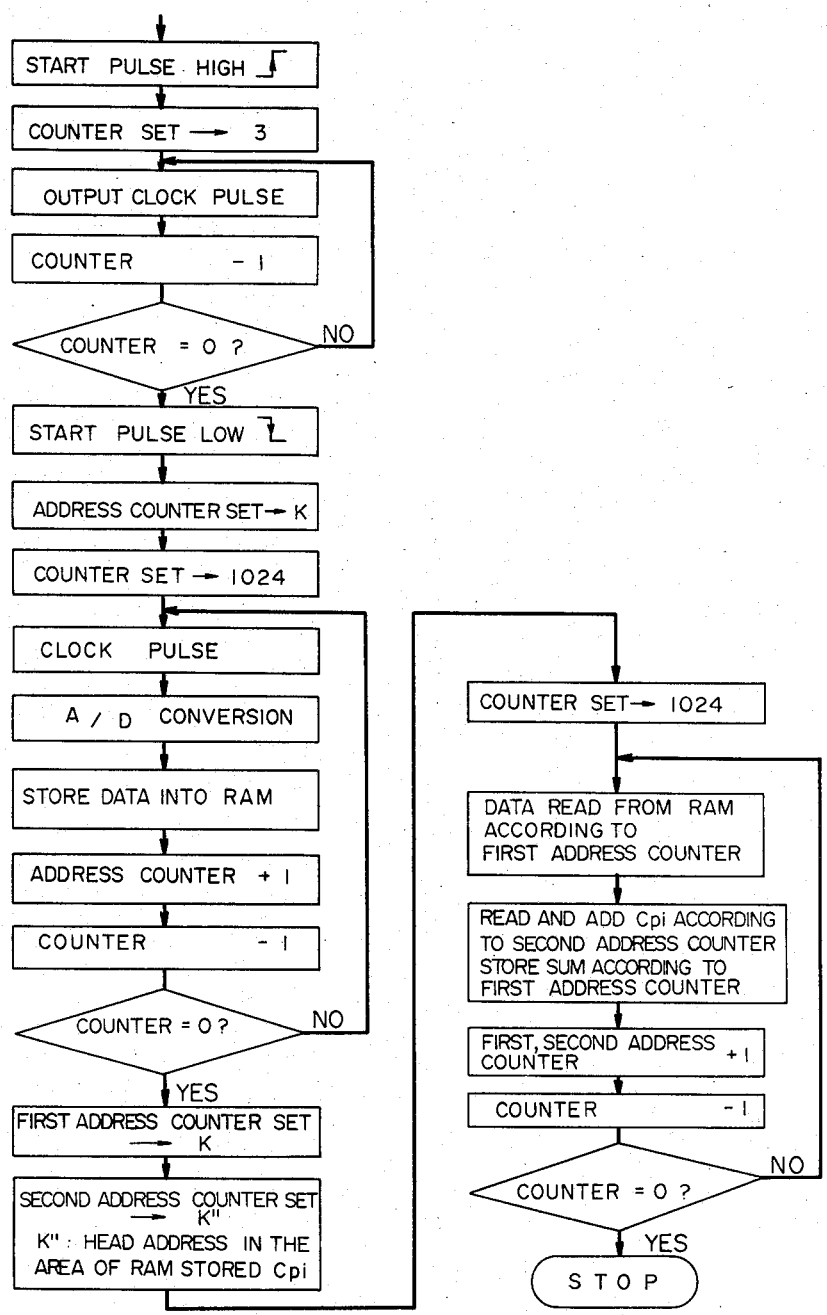
FIG. 10 is a flow chart of a data read into process.

The compensation data $CP_i$ stored as noted above is used for the read process of data from the image sensor 34 as follows: FIG. 10 is a flow chart of the data read process which are adopted as a substitute for the process shown in the FIG. 6. After the data, similarly to the above, is stored in the address K to K+1023 of RAM, the read-out and adding of the compensation data $CP_i$ are carried out. In brief, K is set in the first address counter and K" (head address in the range of the RAM storing the compensation data $CP_i$) is set in the second address counter and the number 1024 is set in the counter. The data from the image sensor 34 is read according to the content of the first address counter and the compensation data $CP_i$ is read out according to the content of the second address counter, so that the data are added (note: as seen from the equation (4), $CP_i$ is plus when the output of photoelectric conversion element is smaller than the mean value $\overline{OP}$), the sum of addition being stored in the RAM according to the content of the first address counter. Then, the process of increasing the first and second address counters by $+1$ and of decreasing the counter by $-1$, is repeated until the content of the counter becomes 0. Thus, the process to add the compensation data $CP_i$, is supplemented to the data read process, thereby obtaining data compensating variations in the conversion characteristics of the respective photoelectric conversion elements at the image sensor 34. Accordingly, even when a variation exists in the conversion characteristic of each photoelectric conversion element, high accuracy measurement can be performed without being affected by any variation.

The apparatus of the invention, as mentioned above, has its components made as firm as possible to eliminate the measurement error caused by external vibrations, and rubber legs 15 are used as buffers, and low-pass filters 56a, 56b and 56c provided, thereby cutting off noise caused by external vibration overcoming the cut-off frequency. When the apparatus is intended to further eliminate the errors caused by external vibration or the disorder of optical system after the lapse of time so as to thereby ensure a flatness measurement with a high accuracy, the following steps need only be taken.

In other words, the optical flat 29, as shown by the alternate long and two short dash line in FIG. 3, is provided at the surface (the reference plane 29a) with a thin line 29b for calibration, formed by the metallic evaporation or the like so that a reflection factor at the line 29b becomes smaller than other portions at the reference plane 29a. The calibration thin line 29b is straight and observed, at the position of image sensor 34, to be perpendicular to the longitudinal direction thereof, and is defined to be positioned on the optical flat 29 and at a side of one longitudinal end of image sensor 34 (concretely, at the position where the bit address to be explained below is larger than 52). Also, the thin line for calibration 29b is long enough to be caught by the image sensor 34 even when the total reflection mirror 32 is kept in the turning range at both sides, and is slightly larger (e.g. 30 μm) in width than the pitch (20 μm in the embodiment) of each photoelectric element at the image sensor 34, thereby being determined to be detected within at least one bit of the same.

Figure 11:
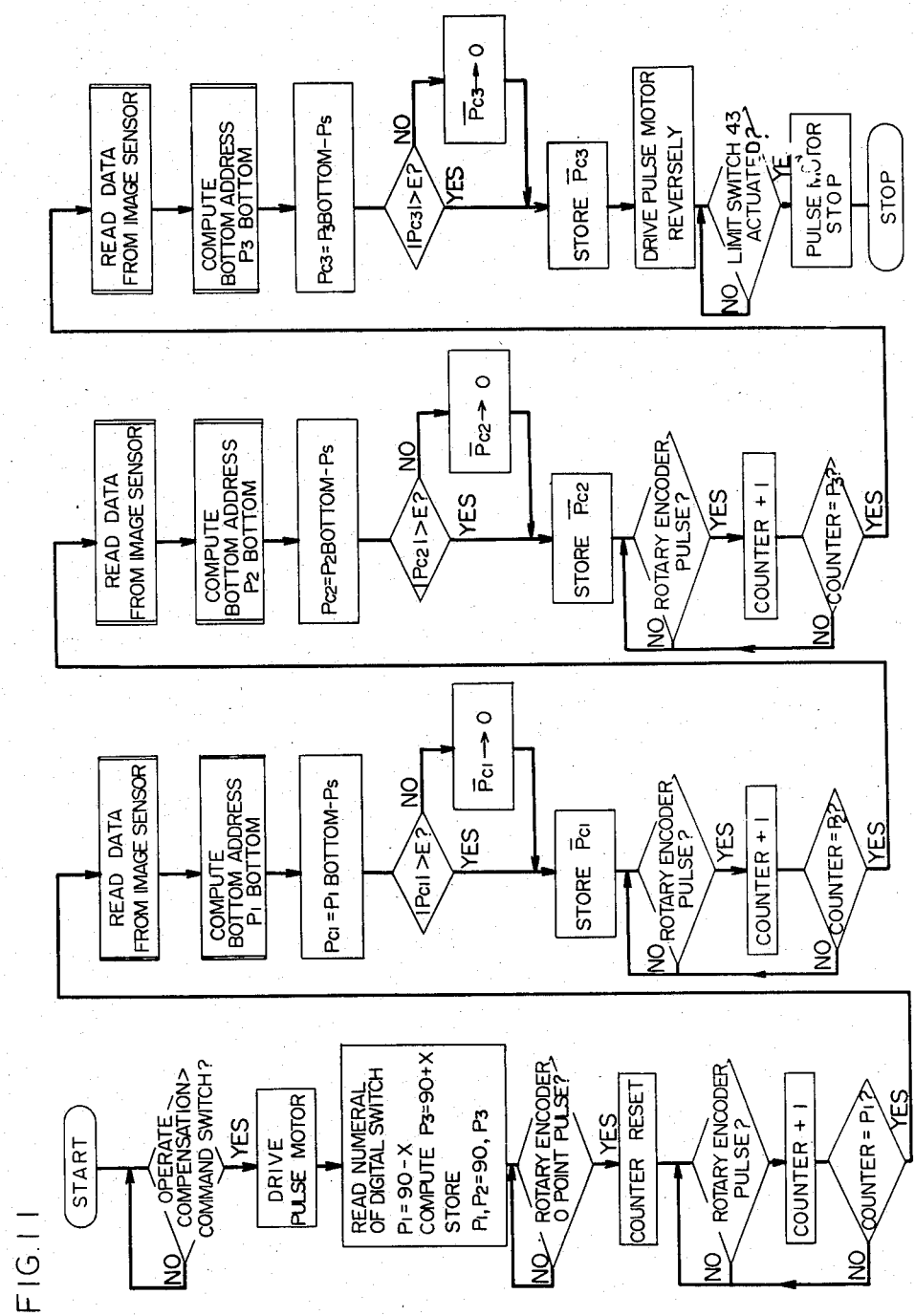
FIG. 11 is a flow chart of a calibrating mode.

FIG. 11 is a flow chart of the control content of microcomputer 48 during the operation in the calibrating mode. Such operation need only be carried out at any time and at need in such a manner that, in condition of notsetting the object 10 to be measured, the calibrating mode command switch (not shown) is operated to give to the microcomputer 48 a command for execution thereof, the microcomputer 48, when detecting the command, allowing the pulse motor 42 to normally rotate. The content X (preset for the subsequent measurement) of digital switch 51 is read to compute $P_1=90-x$ and $P_3=90+x$. $P_2(=90)$, which regulates these $P_1$ and $P_3$ and B position, is stored in the predetermined register. Upon a start of rotation of pulse motor 42, the 0 point pulse is input slightly later from the rotary encoder 41, the input of 0 point pulse resets the counter counting the output pulse of rotary encoder 41 in order to specify the visual field position of image sensor 34. The counting of the output pulse of the rotary encoder 41 is continued and, when it reaches $P_1$ stored in the register, the image sensor 34 reads the data to compute the bottom address $P_1$ bottom (to be explained below). The bottom address means the bit addresses 1 to 1024 at the image sensor 34 which catches the thin line 29b (where the image sensor 34 catches the catoptric light from the reference plane 29a at the optical flat 29, but the thin line 29b portion only is of a low reflection factor and is dark).

Figure 12:
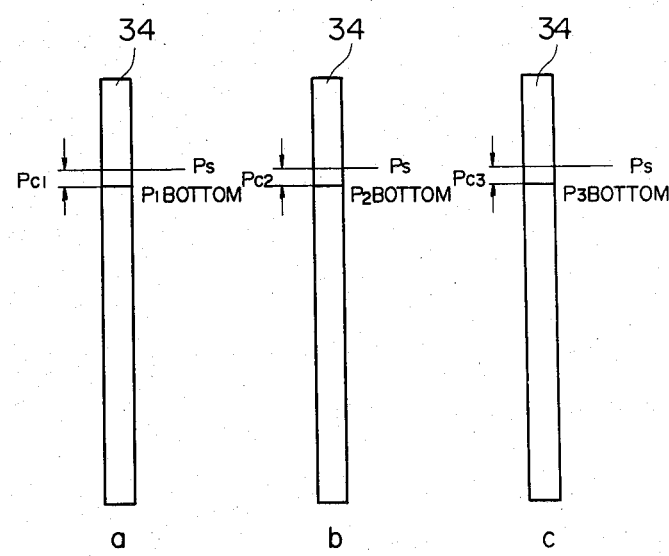
FIG. 12 is a view explanatory of the calibrating data.

Next, $P_{c1} = P_1$ bottom $-P_s$ is computed (see FIG. 12), in which $P_s$ is the reference value previously written in the microcomputer 48, for example, when the apparatus of the invention is assembled, at which time the bit address of image sensor 34 by which the thin line 29b is caught, i.e., the optical system, is fully adjusted, the bit address being to catch the thin line 29b essentially under an ideal condition of causing no vibration.

Next, the absolute value $|P_{c1}|$ is compared with an allowable error E (e.g. two bits) previously written in the ROM so that, when $|P_{c1}|$ is not more than E, O is stored in the RAM, and, when $|P_{c1}|$ exceeds E, $P_{c1}$ just equal to the computed value is stored as the calibrating data $\overline{P_{c1}}$ in the same.

Furthermore, the output pulse of rotary encoder 41 is counted until the counter's content reaches $P_2$, at which time the bottom address $P_2$ bottom is computed similarly to the above to obtain $\overline{P_{c2}}$, which is stored in the RAM. Also, when the counter's content becomes $P_3$, $\overline{P_{c3}}$ is similarly obtained and stored in the RAM. In this case, $P_s$ and E of the same value are used for computing $\overline{P_{c2}}$ and $\overline{P_{c3}}$. Then, the pulse motor 42 is reversely rotated and stopped upon the actuation of limit switch 43, thus completing a series of operations in the calibrating mode.

The calibrating data $\overline{P_{c1}}$, $\overline{P_{c2}}$ and $\overline{P_{c3}}$ stored in the RAM in the calibrating mode are used for computation of flatness $F_1, F_2, \ldots F_{m-1}$. In other words, the peak addresses in one set of three $(P_{11}, P_{21}, P_{31})$, $(P_{12}, P_{22}, P_{32})$ ... $(P_{1i}, P_{2i}, P_{3i})$ ... obtained as to the fringes in common to the visual field positions a, b and c are used to carry out computation of $F_1, F_2 \ldots F_{m-1}$ and flatness F as follows:

$$F_1 = \lambda/2n \times \frac{(P_{21} - \overline{P_{2c}}) - \{(P_{11} - \overline{P_{1c}}) + (P_{31} - \overline{P_{3c}})\}/2}{P_{22} - P_{21}}$$

$$F_2 = \lambda/2n \times \frac{(P_{22} - \overline{P_{2c}}) - \{(P_{12} - \overline{P_{1c}}) + (P_{32} - \overline{P_{3c}})\}/2}{P_{23} - P_{22}}$$

$$F_{m-1} = \lambda/2n \times$$

$$\frac{(P_{2m-1} - \overline{P_{2c}}) - \{(P_{1m-1} - \overline{P_{1c}}) + (P_{3m-1} - \overline{P_{3c}})\}/2}{P_{2m} - P_{2m-1}}$$

Flatness $F = (F_1 + F_2 + \ldots + F_{m-1})/(m - 1)$.

In the above equations, the denominators of multipliers in the equations as to $F_1$ and $F_2$ correspond to P in the equation (1) and also the numerators of the same to $\Delta P$ in the equation (1) or (2). Since P is computed by use of the data only at the visual field position b and of the data obtained about simultaneously, the compensation for a shift in the optical system or vibrations is not required. While, since $\Delta P$ is computed by use of the data at the visual field positions a, b and c, the caribrating data $\overline{P_{1c}}$, $\overline{P_{2c}}$ $\overline{P_{3c}}$ are used for eliminating the disorder in the optical system at each visual field position or a shift from the influence of vibrations at the same. When these values are equal, the compensating data of course have no influence actually on the computation of the flatness F.

Although several embodiments have been described, they are merely exemplary of the invention and not to be constructed as limiting, the invention being defined solely by the appended claims.

What is claimed is:

1. A flatness measuring apparatus which obtains interference fringes related to a plane to be measured and a reference plane, thereby measuring the flatness of said plane to be measured based on said interference fringes, said apparatus comprising:
   an optical system for producing said interference fringes with a light means;
   a one-dimensional image sensor having a number of photoelectric conversion elements arranged in a row to detect said interference fringes;
   said image sensor being disposed to longitudinally detect said interference fringes in the direction of the width thereof;
   a data processing unit which computes said flatness based on an output of said image sensor;
   a data input means for inputting numeric data to said data processing unit;
   an optical means for turning the light from the interference fringes produced by said optical system toward said image sensor;
   said optical means being pivotally supported to be turnable for changing the visual field of said image sensor in the extending direction of said interference fringes,
   and,
   a means for detecting the turning position of said optical means;
   said data processing unit using information related to the detected turning position of said optical means as specific information related to the visual field of said image sensor in computation of the flatness of said plane to be measured, and using said numeric data from said data input means as an information which specifies said visual field of said image sensor;
   said data processing unit comparing the data which has been computed based on the outputs of said image sensor, said computed data corresponding to the positions of said interference fringes as detected by said image sensor, and said outputs being successively output and said data processing unit identifying two of said data outputs corresponding to the positions of two fringes as detected by said image sensor as actually being data corresponding to the same fringe when the dimensional difference in the positions of said two fringes, as detected by said image sensor, is equal to or less than a quarter of the wavelength of said light means used for generating the interference fringes.

2. An apparatus as recited in claim 1, wherein said data processing unit computes and stores data for compensating for differences in conversion characteristics of said respective photoelectric conversion elements based on an output of each of said photoelectric conversion elements of said image sensor when each of said photoelectric conversion elements is receiving substantially uniform light and corrects the output of said image sensor using said stored compensating data during the computation of said flatness.

3. An apparatus as recited in claim 1, further comprising a picture display unit for displaying two-dimensional information of said interference fringes detected by a turn of said optical means.

4. An apparatus as recited in claim 1, further comprising a means for obtaining a hard copy of said two-dimensional information of said interference fringe detected by the turn of said optical means.

5. An apparatus which obtains interference fringes related to a plane to be measured and a reference plane, thereby measuring the flatness of said plane to be measured based on said interference fringes, said apparatus comprising:
   an optical system including said reference plane and being disposed to produce said interference fringes with a light means;
   said reference plane being provided locally with a calibrating area whose reflection factor differs from the rest of said reference plane;
   a one-dimensional image sensor having a number of photoelectric conversion elements arranged in a row to detect said interference fringes;
   said image sensor being disposed to longitudinally detect said interference fringes in the direction of the width thereof;
   a data processing unit which computes said flatness based on an output of said image sensor;
   a data input means for inputting numeric data to said data processing unit;
   an optical means for turning the light from the interference fringes produced by said optical system toward said image sensor;
   said optical means being pivotally supported to be turnable for changing the visual field of said image sensor in the extending direction of said interference fringes, and,
   a means for detecting the turning position of said optical means;
   said data processing unit using information related to the detected turning position of said optical means as specific information related to the visual field of said image sensor in computation of the flatness of said plane to be measured, and using said numeric data from said data input means as an information which specifies said visual field of said image sensor;
   said data processing unit comparing the data which has been computed based on the outputs of said image sensor, said computed data corresponding to the positions of said interference fringes as detected by said image sensor, and said outputs being successively output and said data processing unit identifying two of said data outputs corresponding to the positions of two fringes as detected by said image sensor as actually being data corresponding to the same fringe when the dimensional difference in the positions of said two fringes, as detected by said image sensor, is equal to or less than a quarter of the wavelength of said light means used for generating the interference fringes;
   said data processing unit computing and storing for compensating for differences in conversion characteristics of said respective photoelectric conversion elements based on an output of each of said photoelectric conversion elements of said image sensor when each of said photoelectric conversion elements is receiving substantially uniform light and corrects the output of said image sensor using said stored compensating data during the computation of said flatness;
   said data processing unit also obtaining calibrating information using image sensor output information from said calibrating area as said calibrating information and using said calibrating information during the computation of said flatness.

6. An apparatus as recited in claim 5, further comprising a picture display unit for displaying two-dimensional information of said interference fringes detected by a turn of said optical means.

7. An apparatus as recited in claim 5, further comprising a means for obtaining a hard copy of said two-dimensional information of said interference fringe detected by the turn of said optical means.

* * * * *